US008749711B2

(12) United States Patent
Um

(10) Patent No.: US 8,749,711 B2
(45) Date of Patent: Jun. 10, 2014

(54) METHOD AND APPARATUS FOR CONTROLLING SCREEN OF IMAGE DISPLAY DEVICE

(75) Inventor: Tae Sue Um, Gumi (KR)

(73) Assignee: LG Electronics Inc., Seoul (KR)

( * ) Notice: Subject to any disclaimer, the term of this patent is extended or adjusted under 35 U.S.C. 154(b) by 834 days.

(21) Appl. No.: 12/440,142

(22) PCT Filed: Sep. 5, 2007

(86) PCT No.: PCT/KR2007/004281
§ 371 (c)(1),
(2), (4) Date: Apr. 8, 2009

(87) PCT Pub. No.: WO2008/030036
PCT Pub. Date: Mar. 13, 2008

(65) Prior Publication Data
US 2010/0013995 A1   Jan. 21, 2010

(30) Foreign Application Priority Data

Sep. 6, 2006   (KR) .................. 10-2006-0085500

(51) Int. Cl.
*H04N 5/44* (2011.01)
*H04N 5/50* (2006.01)

(52) U.S. Cl.
USPC ..................... 348/569; 348/553; 348/570

(58) Field of Classification Search
None
See application file for complete search history.

(56) References Cited

U.S. PATENT DOCUMENTS

| 5,926,174 | A * | 7/1999 | Shibamiya et al. | 345/213 |
| 6,429,899 | B1 * | 8/2002 | Nio et al. | 348/443 |
| 7,301,545 | B2 * | 11/2007 | Park et al. | 345/594 |
| 2003/0010894 | A1 * | 1/2003 | Yoshihara et al. | 250/208.1 |
| 2005/0046747 | A1 * | 3/2005 | Park et al. | 348/569 |
| 2006/0056515 | A1 * | 3/2006 | Kato et al. | 375/240.16 |

FOREIGN PATENT DOCUMENTS

| CN | 2566560 Y | 8/2003 |
| CN | 1750635 A | 3/2006 |
| EP | 1174758 A1 | 1/2002 |
| JP | 2006-11547 A | 4/2006 |
| KR | 2001-0017405 A | 3/2001 |
| KR | 2001-0073388 A | 8/2001 |
| KR | 10-2003-0006905 A | 1/2003 |

OTHER PUBLICATIONS

LG, "Televiseur LCD Televiseur plasma", Manuel de L'Utilisateur, date unknown, pp. 1-3, 15-33, 67-82.

* cited by examiner

*Primary Examiner* — Jefferey Harold
*Assistant Examiner* — Michael Teitelbaum
(74) *Attorney, Agent, or Firm* — Birch, Stewart, Kolasch & Birch, LLP

(57) ABSTRACT

Apparatus and method for controlling a screen of an image display device on which an image signal transmitted from a PC can be displayed are provided. In the above apparatus and method, a TV mode and a PC mode are discerned by a selection of a user. In the case of a fast moving picture like in a TV, a fast display frame rate is set, and in the case of many slow moving pictures or still images, a normal display frame rate is set. In the PC mode having a fast moving picture, a motion degree is sensed such that the fast display frame rate is set, thereby preventing an increase in power consumption in advance. Also, a display frame rate most suitable to a display module can be set to thereby improve a life time problem of the display module, so that a user can view a natural screen without an afterimage phenomenon to enhance a user satisfaction.

13 Claims, 2 Drawing Sheets

METHOD AND APPARATUS FOR CONTROLLING SCREEN OF IMAGE DISPLAY DEVICE

TECHNICAL FIELD

The present disclosure relates to an image display device, and more particularly, to apparatus and method for controlling a screen of an image display device on which an image signal transmitted from a personal computer (PC) can be displayed, in which a TV mode and a PC mode are discerned from each other such that a display frame rate can be automatically adjusted.

BACKGROUND ART

Recently, thanks to the development of techniques processing external image signals, it becomes possible to use a TV as a monitor for a PC by setting an external input mode of the TV to a PC input mode and connecting an image signal output line of the PC to a PC input terminal among input terminals of the TV. That is, it is possible to display a PC operating screen on the TV. At this time, as the PC operating screen displayed on the TV, there is a window screen. In these operating screens, the window operating screen has a vertical frequency of 60 Hz.

DISCLOSURE OF INVENTION

Technical Problem

Since a related art image display device has a response time fixed depending on the hardware performance of a module, it may cause a decrease in the life time of the module and an increase in the power consumption.

Technical Solution

In one embodiment, an apparatus for controlling a screen of an image display device, includes: a user interface receiving a wanted command from a user; a power unit supplying a power; a display module operated when the power is supplied through the power unit; and a screen controller controlling the display module such that a frame rate of the display module is differentially applied according to a mode of an input image signal or a characteristic of the display module.

The screen controller may include: a mode determining unit determining the mode of the input image signal; a microprocessor (or micom) performing a control such that the frame rate is differentially applied according to a motion of an image displayed on the display module or the characteristic of the display module according to the mode determined by the mode determining unit; a memory controller accumulating variations in the motion of the image displayed on the display module; an input interface controller performing a control such that the variations in the motion of the image are accumulated according to a control signal of the micom; and a driver timing controller controlling a driver timing according to a frame rate control signal outputted through the input interface controller.

The mode determining unit may determine whether the input image signal corresponds to one selected from the group consisting of a TV mode, a PC mode, and a video/component/HDMI mode.

The driver timing controller may perform a control such that any of 50, 60, 100 and 120 Hz is selected according to a control signal of the input interface controller.

The power unit may variably control a power supply according to the variation in the frame rate set by the screen controller.

The characteristic of the display module may be determined by one selected among an LCD, a PDP, a projection, and a CRT as the display module. The screen controller may perform a control such that an OSD menu for manually selecting the frame rate is displayed when the input image signal has any one of Video/Component/HDMI mode.

The screen controller may perform a control such that only when the mode of the input image signal is a PC mode, the frame rate is differentially set considering a variation in motion of the screen displayed on the display module.

The screen controller may perform a control such that when the variation in motion of the screen displayed on the display module is more than a preset reference range, the frame rate is set to a high level, and when the variation in motion of the screen displayed on the display module is less than the preset range, the corresponding frame rate is set according to the characteristic of the display module.

The micom may sense a variation in motion of the screen according to a variation in R, G and B of the input image signal.

In another embodiment, a method for controlling a screen of an image display device, includes: determining a mode for an input image signal; detecting a motion degree of the screen according to the determined mode; and performing a control such that a display frame rate is differentially set according to the determined mode and the detected motion degree.

The determining of the mode for the input may include determining that the input image signal is inputted through which one among a TV mode, a PC mode and a video/HDMI mode.

The detecting of the motion degree of the screen may include determining a variation per a preset time in R, G and B of a pixel when the determined mode is the PC mode.

The performing of the control may include performing a control such that when the determined mode is the TV mode, a high frame rate including 100 Hz or 120 Hz is set.

The performing of the control may include: when the determined mode is the PC mode, detecting a motion degree of the screen according to the determined mode; when the detected motion degree is more than a preset reference range, setting a high frame rate including 100 Hz or 120 Hz; and when the detected motion degree is less than the preset reference range, performing a control such that a low frame rate different according to the characteristic of the display module is set.

The performing of the control may include: when the determined mode is any one of the Video/Component/HDMI mode, displaying an OSD for selecting any one of a normal frame rate and a fast frame rate; when the normal frame rate is selected by a user, displaying an OSD for selecting a type of the display module; performing a control such that the frame rate is differentially selected according to the type of the display module selected through the displayed OSD; and when the fast frame rate is selected by the user, performing a control such that the fast frame rate including 100 Hz or 120 Hz is set.

The performing of the control such that the frame rate is differentially selected according to the type of the display module may include: when the display module is an LCD or a PDP, setting the frame rate to 60 Hz; and when the display module is a CRT, setting the frame rate to 75 Hz.

The details of one or more embodiments are set forth in the accompanying drawings and the description below. Other features will be apparent from the description and drawings, and from the claims.

Advantageous Effects

The apparatus and method for controlling a screen of an image display device according to the present invention have the following effects.

First, a mode selected by a user is discerned from the remaining mode(s), a motion degree of a screen for each selected mode is sensed such that the display frame rate is automatically adjusted, thereby preventing an increase in power consumption in advance.

Secondly, a display frame rate most suitable to a display module can be set to thereby improve a life time problem of the display module.

Thirdly, a user can view a natural screen without an afterimage phenomenon to enhance a user satisfaction.

BEST MODE FOR CARRYING OUT THE INVENTION

Reference will now be made in detail to the embodiments of the present disclosure, examples of which are illustrated in the accompanying drawings.

Figure 1:
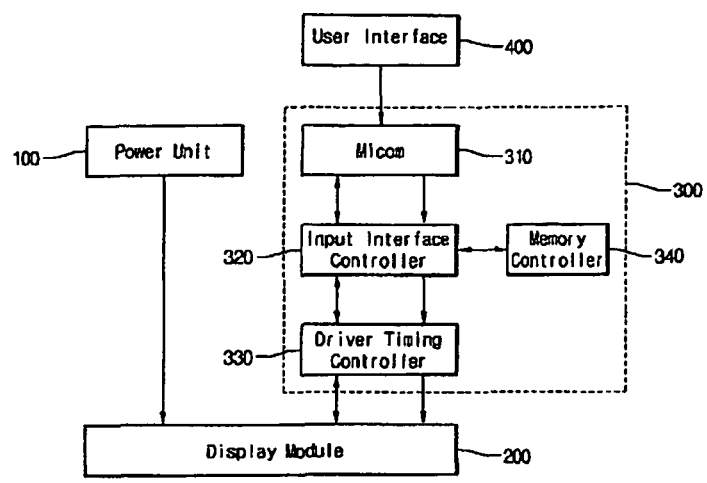
FIG. 1 is a block diagram illustrating an apparatus for controlling a screen of an image display device according to the present invention.
Figure 2:
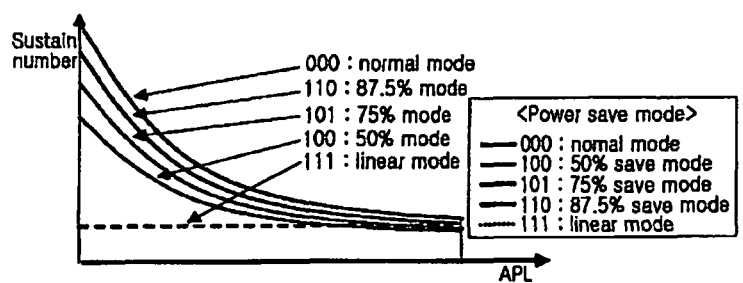
FIG. 2 is a graph showing a relationship between the life times of display modules and the modes.
Figure 3:
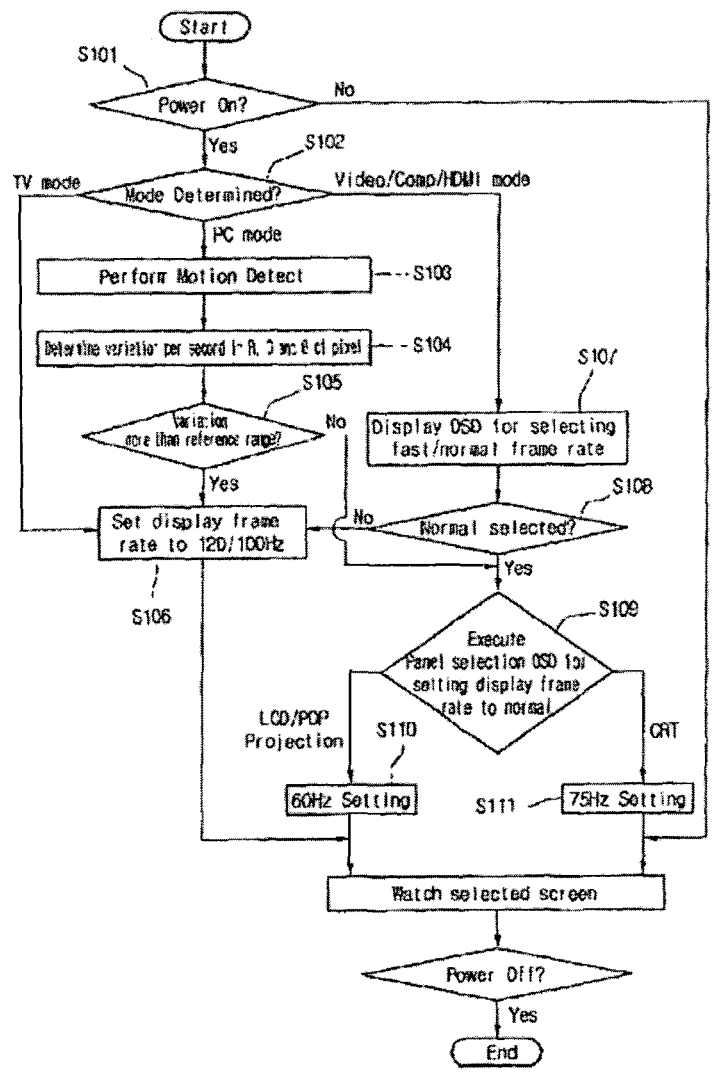
FIG. 3 is a flow chart illustrating a method for controlling a screen of an image display device according to the present invention.

FIG. 1 is a block diagram illustrating an apparatus for controlling a screen of an image display device according to the present invention, FIG. 2 is a graph showing a relationship between the life times of display modules and the modes, and FIG. 3 is a flow chart illustrating a method for controlling a screen of an image display device according to the present invention.

Referring to FIG. 1, an apparatus for controlling a screen of an image display device according to the present invention includes a power unit 100, a display module 200, a screen controller 300, and a user interface 400.

The power unit 100 supplies a power to a set, and the user interface 400 receives a command required by a user from the user. When a power is supplied from the power unit 100, the display module 400 operates to display an input image signal. The screen controller 300 senses a variation in R, G and B of the display module 200 according to a mode selected through the user interface 400 and controls the power and a frame rate according to the sensed variation in R, G and B.

Further, the screen controller 300 is configured to include a microprocessor ('micom') 310, an input interface controller 320, a timing controller 330, and a memory controller 340.

That is, the micom 310 receives the variation in R, G and B from the display module 200 and outputs a control signal for controlling the frame rate. The input interface controller 320 performs a control such that the variations in R, G and B are accumulated according to a control signal of the micom 310.

The timing controller 330 controls a timing of a driver (not shown) according to a frame rate control signal outputted from the input interface controller 320, and the memory controller 340 performs a control such that the variation in R, G and B are accumulated according to a control signal of the input interface controller 320.

Hereinafter, operations of the apparatus for controlling a screen of an image display device with the above construction will be described.

First, as a power On command is inputted through the user interface 400 from a user, the micom 310 should determine a display mode to display an input image signal. That is, the micom 310 should detect whether a first inputted image signal is a fast moving picture signal or not, and according to the detected result, should discern a mode that a fast image signal should be outputted from a mode that a fast image signal should not be outputted.

In other words, the image display device is set in advance to have inherent data for each mode, which can be implemented to be manageable at a source code. Also, if the mode is changed by the user, the micom 310 detects corresponding data and utilizes the detected corresponding data as data for changing the frame rate.

The display frame rates are divided into a fast rate such as 120 Hz, 100 Hz, and a normal rate such as 60 Hz, 75 Hz.

Also, in a PC mode among modes selected by the user, the screen controller 300 employs a normal rate considering that most of images transmitted from the PC are still images and assuming that the colors of R, G and B are nearly not changed.

However, in case where a moving picture is played through the PC mode, the colors of R, G and B are much changed. So, the micom 310 detects the variation rate in the colors of the R, G and B by sampling some pixels, thereby determining a display frame ratio.

That is, the micom 310 detects how much of a difference in the number of frames there is between the R, G and B color data of a first frame and the R, G and B color data of a next frame to the first frame.

As a result of the detection, when the frame difference is greater than a preset range, the micom 310 outputs a control signal such that the fast rate (100 Hz or 120 Hz) is employed, whereas when the frame difference is less than the preset range, the micom 310 outputs a control signal such that the normal rate (60 Hz or 75 Hz) is employed.

Then, as the input interface controller 320 transmits the corresponding control signal to the driver timing controller 330, the display frame rate of the display module 200 is set.

Also, when a video mode, an HDMI mode or the like is selected, a control is performed to display an OSD menu so that the user may select the display frame rate for a corresponding program. At this time, in case where the program is an infant educational program, has many still images, or is a program having a small motion, the normal rate is selected such that the display module 200 is operated by the display frame rate manually set by the user.

Meanwhile, in case where the user does not select the normal rate on the OSD, a fast display frame rate is set.

Also, in case where the normal rate is selected manually by the user or set automatically, each module requires a different frequency frame rate to implement an optimal picture quality.

In other words, in the case of LCD/PDP/Projection, it is not influenced by a flicker noise or the like at a frequency frame rate of about 60 Hz, while in the case of CRT, it is not influenced at a frequency frame rate of more than 75 Hz. Accordingly, the display frame rate can be set differently for different modules considering the characteristics of the modules.

Accordingly, if video/Comp/HDMI mode is selected, the user must first select any one of the fast frame rate and the normal frame rate. For this purpose, the OSD is displayed. That is, if the mode is selected, the OSD is displayed to select a module such that the lowest frame rate considering the picture quality can be selected according to the models of the module.

That is, as shown in FIG. 2, the more the discharge frequency is, the more the power consumption is, while the less the discharge frequency is, the less the brightness is and thus the less the power consumption is. Thus, it is confirmed that the power consumption is different between the fast display frame rate and the normal display frame rate.

Hereinafter, a method for controlling a screen of an image display device will be described with reference to FIG. 3.

Referring to FIG. 3, when a power On command is inputted by a user, it is determined which mode is selected (S101~S102).

Next, as a result of the determination in operation S102, when the PC mode is selected, a motion detect is performed in operation S103. The motion detect is to measure a motion degree of a screen.

Next, variations per second in R, G and B in one pixel are determined, and then it is determined whether the variations are more than a preset reference range (S103~S104).

Next, as a result of the determination in operation S104, when the variations are more than the preset reference range, a fast display frame rate such as 120 Hz or 100 Hz is set (S105).

At this time, even when the selected mode is a TV mode, the fast display frame rate is set.

Meanwhile, in case where the selected mode is a video/Comp/HDMI mode, an OSD is displayed such that the user can directly select a desired frame rate (S107).

Next, it is determined whether the rate selected by the user is the normal frame rate (S108).

Next, as a result of the determination in operation S108, when the selected rate is the normal frame rate, an OSD for selecting a display module for setting the display frame rate to the normal frame rate is displayed (S109).

Next, when LCD/PDP or the like is selected by the user, the display frame rate is set to 60 Hz, while when a CRT is selected by the user, the display frame rate is set to 75 Hz (S110~S111).

As aforementioned, it is first determined whether the mode selected by the user is a TV mode or a PC mode. When the selected mode is a TV mode that a fast moving picture is displayed, a fast display frame rate is set, while the selected mode is a mode having a lot of slow moving pictures or still images, a normal frame rate is set. When the selected mode is a PC mode but an input image signal is a fast moving picture, a motion degree is detected and the display frame rate is set to a fast frame rate.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An apparatus for controlling a screen of an image display device having at least three frame rate determination ways including a first frame rate determination way, a second frame rate determination way, and a third frame rate determination way, the apparatus comprising:

a user interface configured to receive a command from a user;
a power unit configured to supply a power;
a display module configured to be operated when the power is supplied through the power unit;
a mode determining unit configured to determine a mode of an input image signal among a TV mode, a PC mode and an other mode; and
a screen controller configured to determine one among the at least three frame rate determination ways based on the determined mode, to apply the determined frame rate determination way to the display module and to control the display module such that a frame rate of the display module is automatically set according to the determined frame rate determination way,
wherein, if the determined mode is the TV mode, the first frame rate determination way is applied so that the screen controller is configured to set the frame rate to be 100 Hz or 120 Hz,
wherein, if the determined mode is the PC mode, the second frame rate determination way is applied so that the screen controller is configured to detect a variation of motion of the screen displayed on the display module and to set the frame rate based on the detected variation of motion of the screen, and
wherein, if the determined mode is the other mode, the third frame rate determination way is applied so that the screen controller is configured to display an on screen display (OSD) menu for manually selecting the frame rate and set the frame rate based on a user input on the displayed OSD menu.

2. The apparatus according to claim 1, wherein the screen controller comprises:
a micom configured to differentially set the frame rate according to the variation of the motion;
a memory controller configured to accumulate variations in the motion;
an input interface controller configured to perform a control such that the variations in the motion are accumulated according to a control signal of the micom; and
a driver timing controller configured to control a driver timing according to a frame rate control signal outputted through the input interface controller.

3. The apparatus according to claim 2, wherein the other mode is a video/component/HDMI mode.

4. The apparatus according to claim 2, wherein the driver timing controller is configured to perform a control such that one of 50, 60, 100 and 120 Hz is selected as the driver timing according to the frame rate control signal of the input interface controller.

5. The apparatus according to claim 1, wherein the power unit is configured to variably control the power according to the variation in the frame rate differentially set by the screen controller.

6. The apparatus according to claim 1,
wherein the screen controller is configured to determine a type of the display module, and control the display module such that the frame rate of the display module is differentially set according to the mode of the input image signal and the type of the display module, and
wherein the type of the display module is one of an LCD type, a PDP type, a projection type, and a CRT type.

7. The apparatus according to claim 6, wherein the screen controller is configured to perform a control such that
when the variation in the motion is more than a preset reference range, the frame rate is set to a predetermined level, and when the variation in the motion is less than the preset range, the frame rate is set according to the type of the display module.

8. The apparatus according to claim 2, wherein the micom is configured to sense the variation in the motion according to a variation in R, G and B of the input image signal.

9. A method for controlling a screen of an image display device at least three frame rate determination ways including a first frame rate determination way, a second frame rate determination way, and a third frame rate determination way, the method comprising:
    determining a mode of an input image signal among a TV mode, a PC mode and a Video/Component/HDMI mode; and
    automatically setting a frame rate based on the determined mode,
    wherein the setting comprises:
        determining one among the at least three frame rate determination ways based on the determined mode, and
        applying the determined frame rate determination way to the display module,
        wherein applying the determined frame rate determination way comprises:
            when the mode is the TV mode, applying the first frame rate determination way to the display module to automatically set the display frame rate to be 100 Hz or 120 Hz;
            when the mode is the PC mode, applying the second frame rate determination way to the display module to detect motion degree of the screen, and to automatically setting the display frame rate based on the detected motion degree; and
            when the determined mode is the Video/Component/ HDMI mode, applying the third frame rate determination way to the display module to display an on screen display (OSD) for selecting a frame rate by a user to be one of a normal frame rate and a fast frame rate, to select the frame rate through the displayed OSD, and to automatically set the display frame rate based on the frame rate selected through the displayed OSD.

10. The method according to claim 9, wherein the detecting of the motion degree comprises:
    determining a variation per a preset time in R, G and B of a pixel.

11. The method according to claim 9, wherein the setting the display frame rate based on the detected motion degree comprises:
    when the detected motion degree is more than a preset reference range, setting the display frame rate to be 100 Hz or 120 Hz; and
    when the detected motion degree is less than the preset reference range, performing a control such that the display frame rate is set according to a type of the display module.

12. The method according to claim 9, wherein, when the normal frame rate is selected by the user, the method comprises:
    displaying an OSD for selecting a type of the display module;
    selecting the type of the display module via the OSD for selecting the type of the display module; and
    performing a control such that the frame rate is set according to the type of the display module selected through the OSD for selecting the type of the display module; and
    wherein, when the fast frame rate is selected by the user, the method comprises:
        performing a control such that the fast frame rate is set to be 100 Hz or 120 Hz.

13. The method according to claim 12,
    wherein, when the type of the display module is an LCD or a PDP, the method comprises setting the frame rate to 60 Hz; and
    wherein, when the type of the display module is a CRT, the method comprises setting the frame rate to 75 Hz.

* * * * *